United States Patent [19]

White et al.

[11] 4,186,368

[45] Jan. 29, 1980

[54] WIDE RANGE, QUICK RESPONSE TEMPERATURE PROBE SENSOR

[75] Inventors: Peter M. White; David L. Timmins, both of Portland, Oreg.

[73] Assignee: Tektronix, Inc., Beaverton, Oreg.

[21] Appl. No.: 910,177

[22] Filed: May 30, 1978

[51] Int. Cl.² .............................................. H01C 7/04
[52] U.S. Cl. ................................ 338/28; 73/362 AR
[58] Field of Search ............ 338/28, 25, 22 R, 22 SD, 338/229; 73/362 AR; 29/612

[56] References Cited

U.S. PATENT DOCUMENTS

| 3,005,171 | 10/1961 | Beckman | 338/28 |
|---|---|---|---|
| 3,123,790 | 3/1964 | Tyler | 338/28 |
| 3,147,457 | 9/1964 | Gill et al. | 338/28 |
| 3,167,733 | 1/1965 | Di Noia | 338/28 |
| 3,286,214 | 11/1966 | Kolb et al. | 338/28 X |
| 3,776,040 | 12/1973 | Gould | 338/28 X |

Primary Examiner—C. L. Albritton
Attorney, Agent, or Firm—John D. Winkelman

[57] ABSTRACT

An improved resistance-type sensor for an electrical temperature probe includes a thin-film platinum resistor deposited on an oxidized silicon chip. The chip is eutectically bonded to the planar reverse side of a beryllium oxide tip-piece having a hemispherical face adapted for contacting the surface of an object being measured. The tip-piece is set in a thermal insulating plastic mount, spaced from a pair of low resistance electrical leads held by the mount. Very fine wires bonded between the leads and platinum resistor form high thermal impedance electrical connections to the temperature-sensing element.

5 Claims, 3 Drawing Figures

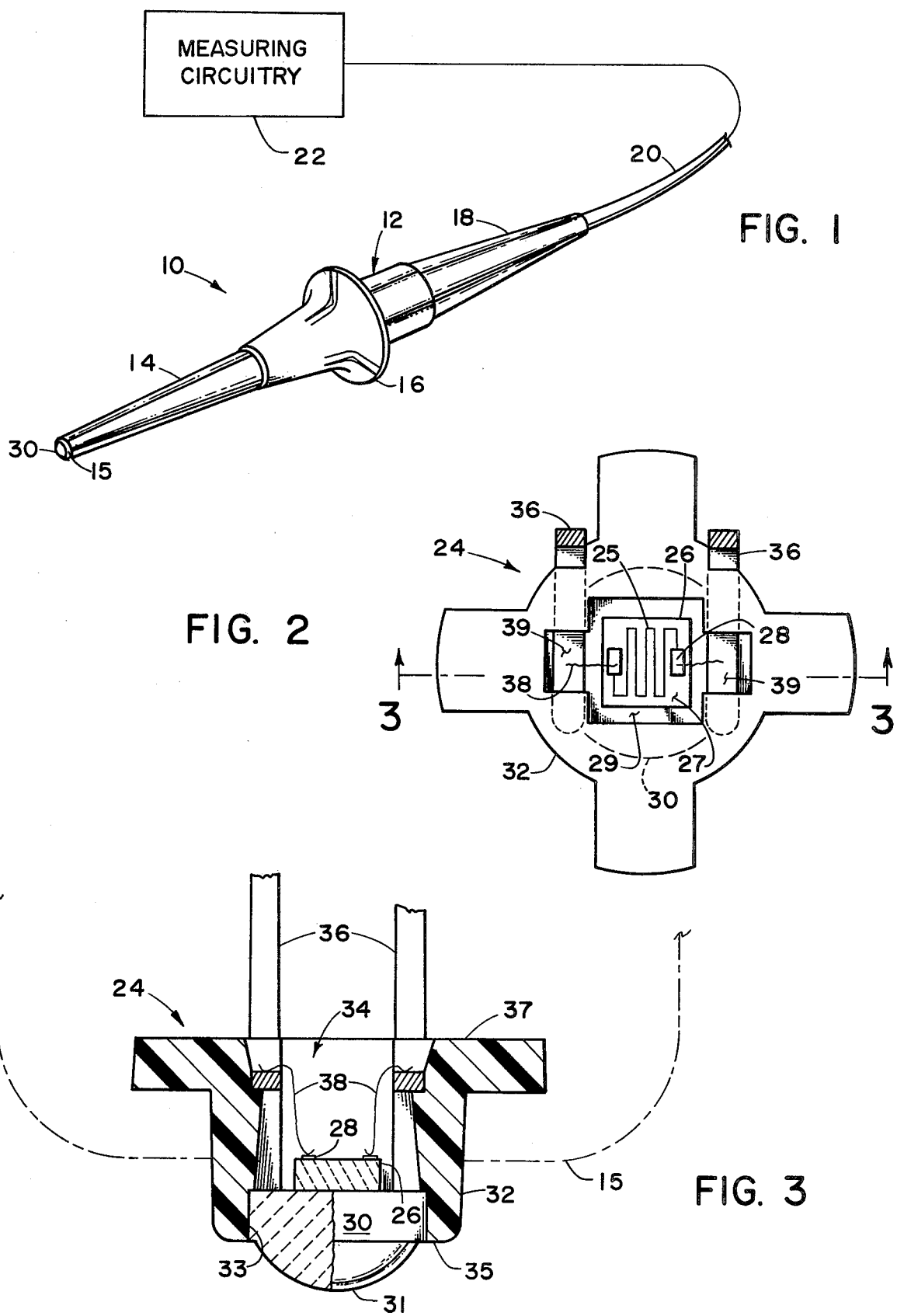

WIDE RANGE, QUICK RESPONSE TEMPERATURE PROBE SENSOR

BACKGROUND OF THE INVENTION

The present invention relates generally to electrical temperature measuring devices, and more particulary to an improved resistance-type sensor for a temperature probe.

Many electrical temperature-measuring devices include an elongate probe having a temperature sensor at one end. Such probes take a variety of forms, depending on their intended use. For example, U.S. Pat. No. 3,308,666 to Anderson et al. describes several ceramic-bodied probes having sensing elements made of refractory metal oxides for measuring extremely high temperatures (above approx. 1100° C.). Such sensors are not suitable for use at lower temperatures, however.

An electrical clinical thermometer system including a probe adapted for insertion into a body cavity is the subject of U.S. Pat. No. 3,776,040 to Gould. The temperature sensor for the probe, which is intended to be thrown away after each use, comprises a gold film formed in a serpentine pattern on a flat base member. U.S. Pat. No. 3,893,058 to Keith concerns a thermister-type clinical probe for an electronic thermometer. Designed to measure the average temperature of its surroundings, the probe's sensor comprises a sprial strip of thermistor material wound around a tubular foundation member for the probe. In a U.S. Pat. to Adams, No. 3,915,003, an electronic clinical thermometer probe is described that includes a metal film (platinum, nickel, chromium or titanium) temperature-sensing resistor deposited on a disk of a high heat conductivity dielectric (alumina, beryllia, etc.). A disposable plastic sheath slips over the temperature-sensing end of the probe to eliminate the need for sterilizing it after each use.

Probes of the type just described and other prior art temperature probes (e.g., the P6058 and P6430 probes sold by Tektronix, Inc.) are not well suited for measurement applications requiring high accuracy over a wide temperature range together with high sensitivity and stability, quick response, and the ability to measure surface temperatures accurately.

SUMMARY OF THE INVENTION

The foregoing deficiencies of the prior art have been overcome in a probe that includes an improved temperature sensor in accordance with the present invention. In a preferred embodiment, such a sensor includes a thin-film platinum resistance element deposited on an oxidized silicon chip. The chip is bonded to the reverse side of a beryllium oxide tip-piece having a substantially hemispherical face adapted for contacting the surface of an object under test. The tip-piece is supported in a themosetting plastic insulating mount, spaced away from a pair of low resistance electrical leads held by the mount. Fine wires bonded between the leads and the opposite ends of the resistance element provide high thermal impedance electrical connections to the temperature-sensing element. A very low thermal impedance path between the hemispherical tip face and the sensing element is provided by the disclosed construction. This, together with the small physical size of the sensor, minimizes thermal inertia for quick response. In addition, measurement inaccuracy and drift caused by heat flow between the sensing element and the metallic electrical leads is all but eliminated by the high thermal impedance of the fine wires interconnecting them.

These and other features and advantages of the invention will be best understood and appreciated by reference to the following detailed description of a preferred embodiment, to be read in conjunction with the accompanying drawing.

BRIEF DESCRIPTION OF THE DRAWING

FIG. 1 is a partly schematic, partly isometric view of a temperature measuring system including a probe incorporating the improved temperature sensor of the invention;

FIG. 2 is a greatly enlarged top plan view of a preferred embodiment of the improved sensor; and FIG. 3 is a vertical sectional view taken along line 3—3 in FIG. 2.

DESCRIPTION OF PREFERED EMBODIMENT

Referring first to FIG. 1, a wide range temperature probe incorporating an improved resistance-type sensor assembly is indicated generally at 10. Probe 10 includes a tubular body 12 having a elongate, tapered forward portion, or barrel, 14 and an integral, outwardly-projecting flange 16. The body is suitably formed of a relatively rigid, high thermal impedance dielectric material rated for continuous duty at high temperatures (over about 225° C.). A thermosetting silicone transfer molding compound rated by Underwriters Laboratories for continuous use to 240° C. (Dow-Corning 308) has been used with good results. Joined to the rear of body 12 is an elongate, flexible boot 18 of a silicone or other high temperature-resistant material. A shielded cable 20 extending from boot 18 electrically connects a platinum temperature-sensing resistor 25 (FIG. 2) in the forward end 15 of barrel 14 to suitable external measuring circuitry 22. Cable 20 is also preferably formed of materials capable of withstanding high temperatures.

A temperature sensor assembly 24 constructed in accordance with the best mode presently contemplated for practicing the invention is shown in FIGS. 2 and 3. Sensor assembly 24 includes a thin-film platinum resistance element 25 disposed on the oxidized upper surface 27 of a silicon chip 26. The platinum element is formed, preferably in a serpentine pattern to provide the required resistance in a minimum of surface area, by conventional thin-film deposition techniques. Gold terminal pads 28 are provided in a similar manner on either end of element 25. Chip 26 is bonded to the planar back, or reverse, surface 29 of a circular beryllium oxide tip-piece 30 having a substantially hemispherical front surface, or face, 31. The silicon chip suitably is attached to the tip-piece by forming a gold alloy bond at the interface between them. For example, after depositing a layer of gold on surface 29, the beryllia tip-piece is heated to about 390° C. and the chip pressed onto the gold-covered surface. A silicon-gold eutectic alloy is produced that, after cooling, forms a low thermal impedance bond between the parts.

Assembly 24 further includes a sensor mounting ring 32 formed in the configuration shown from a heat resistant, thermal insulating dielectric material such as the previously mentioned Dow-Corning 308. Tip-piece 30 is set in a circular section 33 of the mounting ring's central passage 34, with the hemispherical face of the tip-piece protruding from the outer end 35 of the ring. Embedded in mounting ring 32 adjacent its inner, flanged end 37 are the terminal sections of two elongate metal leads 36. The embedded leads intersect opposite sides of passage 34, exposing a portion 39 of each lead. A fine gold wire 38 is connected from each lead portion 39 to an adjacent resistor terminal pad 28. Leads 36 suitably are formed of a low resistance copper alloy such as a No. 155 (silver-copper) or No. 172 (berylium-copper) alloy, and preferably are gold plated. Wires 38 conveniently are attached to the leads and terminal pads using conventional microcircuit wire bonding techniques.

Again referring to FIG. 1 along with FIGS. 2 and 3, assembly 24 is incorporated in probe barrel 14 with the hemispherical surface of the tip-piece 30 exposed at the barrel's forward end 15. Low resistance leads 36 extend substantially the length of the barrel 14 and are connected by soldering, welding or the like to shielded cable 20. In use, a small, constant current is passed through platinum resistance element 25 via cable 20, leads 36 and wires 38 by circuitry 22, which measures the resultant voltage drop across the element. As is known, the resistance and temperature coefficient of resistance (TCR) of pure platinum are highly predictable and reproducible over a wide temperature range. Thus, a voltage drop vs. temperature relationship may be established for the sensor, enabling circuitry 22 to determine the temperture of a tested object on the basis of the measured voltage drop across the platinum resistance element.

By way of example, but not limitation, a temperature sensor assembly 24 may include a 100 ohm platinum resistance element 25 formed in a serpentine pattern on the oxidized surface of a 40 mil square, 15 mil thick chip of silicon by vacuum deposition or sputtering. The chip is attached by a silicon-gold eutectic bond to a 90 mil diameter BeO tip-piece 30 with a substantially hemispherical face 31 having a 44 mil radius of curvature. The sensor unit is cemented in a mounting ring 32 in which two 10×15 mil gold plated beryllium copper leads 36 are embedded. The leads are electrically connected to gold pads 28 by 0.7 mil gold wires 38 attached by thermo-compression bonding. The completed probe has a specified working range of −55° to +250° C.

As will be appreciated, the thermal impedance along a path from the face of tip-piece 30 to temperature sensing element 25 is very low in the disclosed construction. Moreover, the impedance is substantially the same from any point on face 31 because of its hemispherical configuration. This is a significant advantage in making surface temperature measurements, since the thermal path length is essentially independent of the angle at which the probe is held (as long as the tip-piece is in contact with the surface). Thermal isolation for the sensor is provided by the relative low thermal conductivity of plastic ring 32 and, in particular, by the fine wires used to connect the resistance element to leads 36. The large diameter connecting wires used in prior art temperature probes act as a heat sink (or source, depending on the temperature being measured) and draw heat from (or conduct it to) the sensing element. This adversely affects the sensor's response speed and its measurement accuracy, the effect being the same as if a very much larger sensing element were used.

Although an improved temperature sensor has been described with particular reference to a specific, preferred construction, the scope of the invention is limited only by that of the appended claims.

We claim as our invention:

1. A sensor assembly for use in an electrical temperature measuring system that includes a probe, comprising:
    heat conducting dielectric support and contact means including a first surface for supporting a temperature-sensing element and a second, curved surface for contacting a surface of an object being measured,
    a temperature sensitive resistor disposed on said first surface in heat conducting relation therewith,
    heat insulating dielectric means mounting said contact and support means in said probe with said second surface exposed,
    first electrical conductor means mounted in spaced, adjacent relation to said resistor, and
    second electrical conductor means connecting said resistor to said first conductor means, said second conductor means having a heat conducting capability substantially less than that of said first conductor means.

2. The assembly of claim 1, wherein said temperature sensitive resistor is formed from a thin film of platinum.

3. The assembly of claim 1 or 2, wherein said contact and support means comprises a chip of silicon supporting said temperature sensitive resistor on an oxidized first surface thereof, and a body of beryllium oxide having a hemispherically curved second surface, said chip and body being bonded together in heat conducting relation.

4. The assembly of claim 1, wherein said dielectric mounting means comprises a geneally ring-shaped body of a silicone compound.

5. In a temperature probe, a sensor assembly comprising:
    a body of beryllium oxide having a planar first surface and a hemispherically curved second surface opposite said first surface,
    a body of silicon attached to said first surface in heat transfer relation, said silicon body including an oxidized third surface,
    a thin-film platinum resistor disposed on said third surface,
    heat insulating dielectric means mounting said beryllium oxide and silicon bodies in said probe with said second surface exposed,
    first electrical conductor means in said probe, said first conductor means including portions thereof disposed in spaced adjacent relation to said resistor, and
    second electrical conductor means connecting said resistor to said portion of the first conductor means, said second conductor means having a heat conducting capability substantially less than that of said first conductor means.

* * * * *

UNITED STATES PATENT AND TRADEMARK OFFICE
CERTIFICATE OF CORRECTION

PATENT NO. : 4,186,368
DATED : January 29, 1980
INVENTOR(S) : Peter M. White; David L. Timmins It is certified that error appears in the above-identified patent and that said Letters Patent are hereby corrected as shown below:

Column 1, line 29, change "sprial" to --spiral--.

Column 3, line 55, change "relative" to --relatively--.

Column 4, line 38, change "geneally" to --generally--.

Column 4, line 58, change "portion" to --portions--.

Signed and Sealed this

Twenty-second Day of April 1980

[SEAL]

Attest:

SIDNEY A. DIAMOND

Attesting Officer

Commissioner of Patents and Trademarks